United States Patent Office 3,829,361
Patented Aug. 13, 1974

3,829,361
METHOD FOR ATTENUATION OF MUMPS VIRUS
Masao Hoshino, Suita, Osaka, and Yuushi Oka, Takarazuka, Hyogo, Japan, assignors to Takeda Chemical Industries, Ltd., Osaka, Japan
No Drawing. Filed Apr. 27, 1972, Ser. No. 248,193
Claims priority, application Japan, Apr. 30, 1971, 46/29,116
Int. Cl. C12k 5/00, 7/00
U.S. Cl. 195—1.3
8 Claims

ABSTRACT OF THE DISCLOSURE

Novel and effective attenuated live mumps virus vaccines are produced by subjecting mumps virus to passages in a tissue culture containing primary bovine kidney cells until sufficient attenuation is attained.

---

This invention relates to a method for the production of an attenuated live mumps vaccine, the said vaccine being not only novel but also more effective than those which have been hitherto known.

Mumps is an infectious disease which is caused by infection with mumps virus and the onset of which comes after an incubation period of about 3 weeks. In children, principal symptoms are fever and the swelling of the parotid gland and the disease usually runs a benign course with a generally favorable prognosis. In epidemics, however, it spreads fast among hosts living in groups, such as in schools and kindergartens, sometimes forcing the classes to be closed for some time. At times, meningitis, pancreatitis, orchitis and other complications are encountered. The great majority of cases of mumps meningitis end with complete recovery within a month, but some patients are left with electroencephalographic abnormalities, mental retardation and changes in character even one year after apparent recovery. In adults, the disease involves orchitis with a high frequency and leaves sterility behind. Because of those dangers, studies have been made to find measures for combating the disease.

Prophylaxis is naturally a desirable course of action and the possibility of vaccination has been studied.

It is known that the prolonged passages of mumps virus in amniotic or allantoic cavity of embryonated hens' eggs, or a tissue culture of chick embryo cells or of guinea-pig kidney cells give rise to an attenuated live mumps virus vaccine which has reduced virulency and, yet, which is capable of immunizing man against the disease. However, such known vaccines are not always satisfactory from the viewpoint of immunizing activity to vaccine recipients.

The present inventors have unexpectedly found that when mumps virus is subjected to passages in a tissue culture of primary bovine kidney cells, the mumps virus can be rapidly attenuated with the lapse of the passages. Proceeding with attenuation of mumps virus in said specific tissue culture, success has finally been realized in an attenuated mumps virus vaccine which has a high immunizing activity but does not produce undesirable side effects against vaccine recipients.

The principal object of the present invention is to provide a method for attenuation of mumps virus, according to which a virulent mumps virus strain can be far more rapidly attenuated as compared with the known attenuation procedures for mumps virus.

Another object of this invention is to provide a method for the production of a novel and effective attenuated live mumps virus vaccine with ease and at an economically realizable cost.

A further object of this invention is to provide a novel attenuated live mumps vaccine which attains a strong immunizing effect but does not give undesirable side effects after vaccination.

Said objects are realized by subjecting mumps virus to passages in a tissue culture containing primary bovine kidney cells until a sufficient attenuation is attained.

According to the method of this invention, any virulent strain of mumps virus can be employed as the original mumps virus. As the examples of mumps virus strains, there may be enumerated Torii Strain, Toyukura Strain, No. 44010 Strain, No. 43080 Strain, No. 43009 Strain, Enders' Strain and the like. Among many mumps virus strains employed in the present invention, mumps virus Torii Strain is especially advantageously employed in the present method for producing attenuated mumps virus vaccine. Mumps virus Torii Strain has been isolated from a throat swab of a Japanese child suffering from mumps and its subculture has been deposited at American Type Culture Collection, Maryland, U.S.A. under the accession number of ATCC VR-638.

The primary bovine kidney cells to be employed in the method of the present invention can be prepared in a *per se* established manner. Mumps virus is inoculated in a tissue culture which contains said cells together with a suitable tissue culture medium, and is cultivated stationarily or rotationally for about 5 to about 12 days (usually about one week). The cultivation is practically conducted at a temperature of about 28° to about 36° C., most advantageously about 29° to about 32° C. Thus-obtained virus fluid is then inoculated into a fresh tissue culture containing the said cells for the subsequent passage as it is or after a suitable dilution. As such passage is repeated successively, the attenuation of the mumps virus proceeds rapidly.

As the tissue culture media to be employed, there may be counted, for example, Hanks' balanced salt solution, Earle's solution, Gey's solution, TC medium 199, Eagle's medium, and the like. These media may be supplemented, as occasion demands, with suitable ingredients, e.g. lactalbumin hydrolyzate, inactivated calf serum and so on. Furthermore, there may be added to the media an antibiotic or antibiotics such as penicillins (e.g., penicillin G, penicillin N, penicillin O and penicillin V, etc.), streptomycin, dihydrostreptomycin, neomycin or kanamycin, so that the culture may be protected against propagation of adventitious microorganisms by accidental contamination, after the known manner in case of virus cultivation.

In such a manner, the mumps virus is repeatedly subjected to the passages in a tissue culture containing primary bovine kidney cells until the virus is sufficiently attenuated. Mumps virus can be far more rapidly attenuated by passages in the tissue culture containing primary bovine kidney cells as compared with the known attenuation procedures for mumps virus (refer to Test detailed hereinafter).

The said attenuation of mumps virus can be further facilitated by applying the limiting dilution in the passages with the tissue culture containing primary bovine kidney cells. In the application of the limiting dilution, the culture fluid of the preceding passage is serially diluted by a dilution factor selected from 2 to 10. Each of the diluted fluids is inoculated into a fresh tissue culture containing primary bovine kidney cells and cultivated to determine the highest dilution for the propagation of the virus in the said passage. The culture fluid obtained from the seed virus fluid of the highest dilution is employed as the seed virus for the next passage. The limiting dilution may be applied to any optioned passage or passages in the series of passages with the tissue culture containing the said primary kidney cells.

As occasion demands, the series of passages of mumps virus with the tissue culture of the said kidney cells may be conducted by inserting one passage or passages with a tissue culture of other animal cells into the series. As such other animal cells there may be included, for example, chick embryo cells, primary swine kidney cells, quail embryo cells or the like. It is especially advantageous to insert a total of 1 to 5 passages with chick embryo cells into the main passages with primary bovine kidney cells.

In the method of this invention, the passages of mumps virus are continued until it is confirmed that the virus has sufficiently been attenuated, by a tentative inoculation into seronegative animal or human body susceptible to mumps virus. Though the times of passages required for the sufficient attenuation vary with the virulency of the original mumps virus employed, the conditions of passages and the like, it is generally recommended to conduct at least 3 passages with the tissue culture containing primary bovine kidney cells; meanwhile passages more than 30 times are not generally recommended as there is a risk that the virus is over-attenuated.

Thus attenuated mumps virus is used as the seed virus for the production of the attenuated mumps virus vaccine of the present invention. The seed virus is inoculated and cultivated in a suitable tissue culture for the vaccine production, e.g. those containing chick embryo cells, primary bovine kidney cells, primary African green monkey kidney cells, primary swine kidney cells, primary guinea-pig kidney cells or the like, in a *per se* known manner. It is recommended that the virus be allowed to propagate in a culture medium not containing substances that may act as an antigen when the resulting vaccine is inoculated into human body. As occasion demands, the seed virus may be subjected to several passages in the tissue culture for vaccine production so as to heighten virus titer of the vaccine.

From the culture fluid thus obtained, solid materials such as cells, cell fragments or the like are removed, for example, by means of filtration or centrifugation, and the filtrate or the supernatant fluid can be used, as the product of the present invention, *per se* or diluted with a suitable diluent such as a physiological salt solution or distilled water, depending on its virus titer.

While the attenuated mumps virus vaccine thus produced is ready for use, it can be preserved after the conventional manner for preserving live vaccines, in a frozen form with or without addition of one or more stabilizing agents such as sucrose, lactose, glutamates, phosphates and the like. Alternatively, it may be lyophilized with or without addition of one or more of stabilizing agents such as human serum albumin, gelatin and the like for its storage, and the lyophilized product is dissolved upon its use with a suitable diluent such as a physiological salt solution or sterile distilled water.

For a satisfactory vaccination, it will be required to inoculate at least $10^{2.0}$ $TCID_{50}$ (50% Tissue Culture Infectious Dose) of mumps virus titer per person, preferably subcutaneously and in one-time administration. A particularly advantageous dose is about $10^{3.0}$ to about $10^{4.5}$ $TCID_{50}$ per person. A dose higher than this dose not give any danger of undesirable side effects because of the high safety of the vaccine presented here, but it will be meaningless to use so high dosage since there is not expected any particular increase in the desired vaccination effect.

For the subcutaneous inoculation, a dose of the necessary virus titer is practically allowed to be contained in an aqueous composition of about 0.1 to about 1.0 ml., desirably 0.25 to 0.5 ml., in volume. Thus, the vaccine of the present invention is practically adjusted, at the use, so as to comprise the attenuated mumps virus in a titer of at least about $10^{3.0}$ $TCID_{500}$/ml., desirably about $10^{3.5}$ to about $10^{5.5}$ $TCID_{50}$/ml., together with a physiologically acceptably carrier therefor such as a physiological salt solution or distilled water.

When the attenuated mumps virus vaccine thus produced is inoculated into vaccine recipients there is subsequently observed a remarkable elevation of the antibody level in sera which will prevent them from infection of mumps virus, while there are observed no undesirable side effects such as fever and lymphadenopathy. Thus, the novel attenuated mumps virus of this invention is characterized by its high immunizing activity as well as by its high safety.

The effectiveness and safety of the attenuated mumps virus vaccine of this invention will be further explained by way of Examples and Test hereinafter described.

The following Examples are merely intended to illustrate presently preferred embodiment of this invention and are not to be construed as limitation of this invention.

Throughout the present specifications as well as in the following Examples and Test, abbreviations "g.," "ml.", "r.p.m." and "C." respectively refer to "gram(s)," "milliliter(s)," "round(s) per minute" and "degree(s) centigrade"; percentages are volume/volume unless otherwise specified; and the chick embryo cells used are to be negative to the Cofal test (refer to e.g. Sarma, P. S., et al.; Virology, *23*, 313 et seq. (1964)).

Example 1

Kidneys are removed aseptically from healthy cattle. The bovine kidneys (referred to as "BK" hereinafter) are washed with Hanks' balanced salt solution [1] and are minced. The minced tissue is suspended in about 50-fold volume of a 0.25%-trypsin-supplemented Hanks' solution, and is digested under stirring. The resulting free cells are collected by centrifugation at 1,000 r.p.m. for 5 minutes, and diluted with such an amount of a lactalbumin Hanks' solution [2] containing 10% of inactivated calf serum that the resultant cell suspension contains about $5\times10^5$ cells per ml. The suspension is incubated stationarily in bottles of 50 ml. capacity at 36° C. After 7 days when the cells have firmly propagated on the inside wall of the bottles, the cells are washed three times with TC medium 199 [3] to give a primary cell culture of BK.

---

[1] Hank's balanced salt solution consists of:

| | G. |
|---|---|
| NaCl | 8.0 |
| KCl | 0.4 |
| $CaCl_2$ | 0.2 |
| $MgSo_4.7H_2O$ | 0.2 |
| $Na_2HPO_4.2H_2O$ | 0.06 |
| $KH_2PO_4$ | 0.06 |
| d-Glucose | 1.0 |
| $NaHCO_3$ | 0.25 |
| Phenol red | 0.02 |

Distilled water (triple-distilled), an amount to make the total 1 liter.

[2] Lactalbumin Hanks' solution is prepared by dissolving 5 g. of lactalbumin hydrolyzate in the Hanks' balanced salt solution to make the total 1,000 ml.

[3] TC medium 199 is a sterile aqueous solution adjusted to pH 7.2 containing amino acids, purine base, pyrimidine bases, vitamins, sugars, nucleotides, inorganic salts, etc. The detailed composition is described in: e.g., Morgan, J. F., et al.; Proc. Soc. Exp. Biol. Med., *73*, pp. 1 to 8 (1950).

5 ml. of 100-fold-diluted fluid of mumps virus Torii Strain passaged 2 times in amniotic cavity of embryonated hens' eggs is inoculated into the BK cell culture and is kept standing at 37° C. for 60 minutes. The culture fluid is discarded, and the cells are washed 5 times with TC medium 199. Then, 5 ml. of TC medium 199 containing 2% of inactivated calf serum is added to the bottle, and stationary incubation is carried out at 32° C. for 7 days. The resulting culture is centrifuged at 3,000 r.p.m. for 5 minutes to separate a supernatant, which is to be used as the seed virus in the next passage after dilution to 100-fold volume by TC medium 199.

In this manner, 15 passages with the BK tissue culture are conducted, and the culture of the 15th cultivation is centrifuged to obtain an attenuated seed virus for the production of a mumps virus vaccine.

Chick embryos (referred to as "CE" hereinafter) are aseptically removed from the eggs of the 10th day of incubation and, after decapitating and eviscerating, are processed in the same manner as in the preparation of the BK cell culture to give a CE cell culture.

10 ml. of the 100-fold diluted seed virus is inoculated into the CE cell culture in Roux bottles of 500 ml. capacity and 50 ml. of serum-free TC medium 199 is added to each of the bottles. The bottles are stationarily incubated at 32° C. for 7 days. The resulting culture is centrifuged at 3,000 r.p.m. for 5 minutes to give a supernatant, being an attenuated mumps virus vaccine. The supernatant shows a mumps virus titer of $10^{4.5}$ $TCID_{50}$/ml. assayed by a *per se* established method employing primary kidney cells of African green monkey as described in e.g. Amer. J. Epidermiol., *89*, pp. 176–183 (1969).

The product is frozen for storage at −70° C. After 100 day storage, it is thawed and diluted 5 times by volume with a physiological salt solution. The diluted vaccine is subcutaneously inoculated to an arm to exhibit the desirable effect of immunization in vaccine recipients without showing any sign of untoward side effects such as fever and lymphadenopathy.

Example 2

In this Example mumps virus Torii Strain is subjected to 3 times of passages with the application of limiting dilution to each passage.

Thus, the fluid of Torii Strain passaged 2 times in amniotic cavity of embryonated hens' eggs is diluted with TC medium 199 by serial 3-fold dilution from $1:3^7$ to $1:3^{13}$ and 0.2 ml. each of the diluted fluids is inoculated into a BK cell culture in 20 bottles of 50 ml. capacity, which is prepared in the same manner as in Example 1, and incubated for 7 days under the same conditions as in Example 1. The resulting cultures are independently centrifuged at 3,000 r.p.m. for 5 minutes to obtain supernatants, which are subsequently frozen for storage at −70° C.

The highest dilution for the virus propagation in the said passage is determined in the following manner:

The cells separated from the fluids as above and remaining in the bottles are washed twice with Hanks' balanced salt solution. Then, 3 ml. of a 0.5% suspension of guinea-pig erythrocytes in Hanks' balanced salt solution is added to each bottle and the respective bottles are kept standing at room temperature for 45 minutes. The erythrocyte suspension in each bottle is discarded and, after washing 3 times with Hanks' balanced salt solution, the cells in each bottle are microscopically examined for the adsorption of guinea-pig erythrocytes on the cells to determine the highest dilution for the propagation of the virus.

Among the supernatants above-stored only those obtained from the seed virus fluid of the highest dilution are thawed. The thawed fluids are diluted with TC medium 199 by serial 3-fold dilution from $1:3^4$ to $1:3^{13}$. 0.2 ml. each of the diluted fluids is inoculated into a fresh BK cell culture in 10 bottles of 50 ml. capacity, and incubated under the same conditions as mentioned above. The highest dilution for the virous propagation is again determined in the abovementioned manner and the culture fluids obtained from the seed virus fluid of the highest dilution is employed as the seed virus in the next passage after diluted by serial 3-fold dilution.

In this manner, 3 passages with the BK cell culture are conducted with application of limiting dilution to each passage, and the culture of the 3rd cultivation is centrifuged to obtain an attenuated seed virus for the production of a mumps virus vaccine.

The seed virus is inoculated into a CE cell cuture in Roux bottles and cultivated in the same manner as in Example 1 by the use of a serum-free TC medium 199, whereby an attenuated mumps virus vaccine is obtained. This vaccine shows a mumps virus titer of $10^{4.8}$ $TCID_{50}$/ml., assayed in the same manner as in Example 1.

In the same manner as in Example 1, the product is frozen for storage, and thereafter thawed and used for vaccination to give satisfactory immunization in vaccine recipients.

Example 3

0.2 mil. of a 100-fold-diluted fluid of mumps virus Torri Strain passaged 2 times in amniotic cavity of embryonated hens' eggs is inoculated into a BK cell culture in bottles of 50 ml. capacity, which is prepared in the same manner as in Example 1, and incubated for 7 days under the same conditions as in Example 1. The resulting culture is centrifuged at 3,000 r.p.m. for 5 minutes to separate a supernatant, which is to be used as the seed virus in the next passage after dilution to 100-fold volume by TC medium 199.

0.2 mil. of a 100-fold-diluted fluid of mumps virus Torii by carrying out 2 passages with the BK cell culture in the above-mentioned manner is inoculated and cultivated in a tissue culture of CE cells in bottles of 50 ml. capacity under the same conditions as above-mentioned. The resulting culture is centrifuged at 3,000 r.p.m. for 5 minutes to give a supernatant, which is to be used as the seed virus in the next passage.

In this manner, an alternating cycle of cultivation of Torii Strain in the BK cell culture and the CE cell culture, two consecutive passages, each, is carried out twice, and the culture of the last cultivation is centrifuged at 3,000 r.p.m. for 5 minutes to give an attenuated seed virus for the production of a mumps virus vaccine.

The seed virus is inoculated into a CE cell culture in Roux bottles and processed in the same manner as in Example 1 by the use of a serum-free TC medium 199, whereby an attenuated mumps virus vaccine is obtained. This vaccine shows a mumps virus titer of $10^{4.8}$ $TCID_{50}$/ml., assay in the same manner as in Example 1.

In the same manner as in Example 1, the product is frozen for storage, and thereafter thawed and used for vaccination to give satisfactory immunization in vaccine recipients.

Example 4

The fluid of mumps virus Torii Strain passaged 2 times in amniotic cavity of embryonated hens' eggs is diluted with TC medium 199 by serial 3-fold dilution from $1:3^7$ to $1:3^{13}$ and 0.2 ml. each of the diluted fluids inoculated into a BK cell culture in 20 bottles of 50 ml. capacity each, which is prepared in the same manner as in Example 1, and incubated for 7 days under the same conditions as in Example 1. With regard to the resulting cultures the highest dilution for the propagation of the virus is determined in the same manner as in Example 2.

0.2 ml. of a 100-fold dilution of the culture fluid obtained from the seed virus fluid of the highest dilution is inoculated into a fresh BK cell culture and incubated for 7 days under the same conditions as in Example 1. The resulting culture is centrifuged at 3,000 r.p.m. for 5 minutes to give a supernatant, which is to be used as the seed virus in the next passage after dilution to 100-fold volume by TC medium 199.

In this manner, 17 passages with the BK cell culture are conducted with the application of the limiting dilution to the first passage and the 6th passage.

The culture obtained from the 17th cultivation is centrifuged at 3,000 r.p.m. for 5 minutes to give an attenuated seed virus for the production of a mumps virus vaccine.

The seed virus is inoculated into a CE cell culture in Roux bottles and processed in the same manner as in Example 1 by the use of a serum-free TC medium 199, whereby an attenuated mumps virus vaccine is obtained. This vacinne shows a mumps virus titer of $10^{5.5}$ $TCID_{50}$/ml., assayed in the same manner as in Example 1.

In the same manner as in Example 1, the product is frozen for storage, and thereafter thawed and used for vaccination to give satisfactory immunization in vaccine recipients.

Example 5

In the same manner as in Example 4, mumps virus Torii Strain is subjected to 12 passages in the BK cell culture with the application of the limiting dilution to the first passage and the 6th passage.

The culture obtained from the 12th cultivation is centrifuged at 3,000 r.p.m. for 5 minutes to give an attenuated seed virus for the production of a mumps virus vaccine.

The seed virus is inoculated into a CE cell culture in Roux bottles and processed in the same manner as in Example 1 by the use of a serum-free TC medium 199, whereby an attenuated mumps virus vaccine is obtained. This vaccine shows a mumps virus titer of $10^{6.3}$ TCID$_{50}$/ml., assayed in the same manner as in Example 1.

In the same manner as in Example 1, the product is frozen for storage, and thereafter thawed and used for vaccination to give satisfactory immunization in vaccine recipients.

Example 6

0.2 ml. of a 100-fold-diluted fluid of mumps virus Torii Strain passaged 2 times in amniotic cavity of embryonated hen's eggs in inoculated into a CE cell culture in bottles of 50 ml. capacity, which is prepared in the same manner as in Example 1, and incubated for 7 days under the same conditions as in Example 1.

The virus fluid obtained from the above-mentioned cultivation is inoculated and cultivated in a BK cell culture with the application of the limiting dilution in the same manner as in Example 2.

0.2 ml. of a 100-fold dilution of the culture fluid obtained from the seed virus fluid of the highest dilution is inoculated and incubated in a fresh CE cell culture.

In this manner, an alternating cycle of cultivation of Torii Strain in the CE cell culture and the BK cell culture, one passage each, is conducted 6 times, with the application of the limiting dilution to the 1st, 2nd, 4th and 5th cultivations in the BK cell cultures.

The culture obtained from the last cultivation is centrifuged at 3,000 r.p.m. for 5 minutes to give an attenuated seed virus for the production of a mumps virus vaccine.

The seed virus is inoculated into a CE cell culture in Roux bottles and processed in the same manner as in Example 1 by the use of a serum-free TC medium 199, whereby an attenuated mumps virus vaccine is obtained. This vaccine shows a mumps virus titer of $10^{6.5}$ TCID$_{50}$/ml., assayed in the same manner as in Example 1.

In the same manner as in Example 1, the product is frozen for storage, and thereafter thawed and used for vaccination to give satisfactory immunization in vaccine recipients.

Test

The attenuation of mumps virus attained by passages with the BK cells was compared with that attained by passages with the CE cells and the primary cells of guinea-pig kidney (referred to as "GPK" hereinafter), the CE cells and GPK cells being employed as the representatives of the hitherto known cells for the attenuation of mumps virus.

Mumps virus Torii Strain passaged 2 times in amniotic cavity of embryonated hens' eggs was subjected to 15 passages with the BK cells under the same conditions as in Example 1. As the control runs, said Torii Strain was subjected to 15 passages with the CE cells or the GPK cells under the same conditions as above.

The lowering of the mumps virus virulence with the lapse of passages was determined with regard to the respective passage systems in the following manner:

The respective virus fluids of the 1st, 5th, 7th, 10th and 15th cultures were inoculated into parotid glands of rhesus monkeys in a dose of $5 \times 10^3$ TCID$_{50}$ per animal.

Clinical reaction,[1] mumps virus antibody titer[2] of animal sera and mumps virus isolation from the throat swabs[3] were determined with regard to the respective inoculated animals.

---

[1] Clinical reaction: Swelling of the parotid glands and other symptoms attributed to the inoculation were observed during 3 weeks immediately subsequent to the inoculation.

[2] Mumps virus antibody titer: Serum samples of animals were collected on 21st day after the inoculation and neutralizing antibody titer was determined with regard to the respective samples by Buynak et al. method described in Proc. Soc. Exp. Biol. Med., 125, pp. 1068–1071 (1967).

[3] Mumps virus isolation from the throat swabs: During 17 days starting from 5th day after the inoculation, throat swabs were collected from all the animals and examined by Francis et al. method described in Amer. J. Epidemiol., 89, pp.176–183 (1969).

The results are summarized in Table 1 below:

TABLE 1

| Passage history of virus fluid | Clinical reaction | Neutralizing antibody titer | Virus isolation from throat swabs |
|---|---|---|---|
| BK-1 | + | 1:256 | + |
| BK-5 | − | 1:64 | − |
| BK-7 | − | 1:32 | − |
| BK-10 | − | 1:16 | − |
| BK-15 | − | 1:16 | − |
| CE-1 | + | 1:256 | + |
| CE-5 | + | 1:64 | + |
| CE-7 | − | 1:32 | + |
| CE-10 | − | 1:16 | − |
| CE-15 | − | 1:8 | − |
| GPK-1 | + | 1:256 | + |
| GPK-5 | + | 1:128 | + |
| GPK-7 | + | 1:64 | + |
| GPK-10 | + | 1:64 | + |
| GPK-15 | − | 1:32 | + |

What is claimed is:

1. A method for producing an attenuated mumps virus vaccine, which comprises subjecting mumps vaccine to passages at a temperature of about 28° to about 36° C. in a tissue culture consisting essentially of primary bovine kidney cells until a sufficient attenuation is attained.

2. A method according to claim 1, wherein the passages are conducted with at least one application of the limiting dilution.

3. A method according to claim 1, wherein the passages are conducted with the insertion of 1 to 5 passages in a tissue culture containing chick embryo cells.

4. A method according to claim 1, wherein the mumps virus is subjected to at least 3 passages.

5. In a method for attenuating mumps virus which comprises subjecting mumps virus to passages at a temperature of about 25° to about 36° C. in a tissue culture and ceasing said passages when sufficient attenuation is attained, the improvement wherein the passages are conducted in a tissue culture consisting essentially of primary bovine kidney cells.

6. A method according to claim 5, wherein the passages are conducted with at least one application of the limiting dilution.

7. A method according to claim 5, wherein the passages are conducted with the insertion of 1 to 5 passages in a tissue culture containing chick embryo cells.

8. A method according to claim 5, wherein at least 3 passages are conducted in the tissue culture containing primary bovine kidney cells.

References Cited

UNITED STATES PATENTS 3,133,861  5/1964  Schwarz _____ 195—1.3
3,555,149  1/1971  Buynak et al. _____ 195—1.3

RICHARD L. HUFF, Primary Examiner

U.S. Cl. X.R.

424—89